April 16, 1968     R. B. BUONAIUTO     3,377,653
APPARATUS FOR MAKING FOAMED PLASTIC ARTICLES
Filed Nov. 10, 1964     6 Sheets-Sheet 1

INVENTOR.
ROBERT B. BUONAIUTO
BY

ATTORNEY

INVENTOR.
ROBERT B. BUONAIUTO
BY
ATTORNEY

April 16, 1968 R. B. BUONAIUTO 3,377,653
APPARATUS FOR MAKING FOAMED PLASTIC ARTICLES
Filed Nov. 10, 1964 6 Sheets-Sheet 3

INVENTOR.
ROBERT B. BUONAIUTO
BY
ATTORNEY

April 16, 1968 R. B. BUONAIUTO 3,377,653
APPARATUS FOR MAKING FOAMED PLASTIC ARTICLES
Filed Nov. 10, 1964 6 Sheets-Sheet 4

INVENTOR.
ROBERT B. BUONAIUTO
BY
ATTORNEY

INVENTOR.
ROBERT B. BUONAIUTO
ATTORNEY

United States Patent Office 3,377,653
Patented Apr. 16, 1968

3,377,653
APPARATUS FOR MAKING FOAMED PLASTIC ARTICLES
Robert B. Buonaiuto, 3 McLean Parkway, Ludlow, Mass. 01056
Filed Nov. 10, 1964, Ser. No. 410,247
2 Claims. (Cl. 18—5)

ABSTRACT OF THE DISCLOSURE

Apparatus for the production of foamed plastic articles by the use of dielectric heating means and having automatic means for transferring a mold through a loading station, a heating station, a cooling station and an ejection station.

---

This invention relates to the manufacture of foamed plastic articles and has particular reference to a novel means for making articles from expandable polymeric materials, such as disclosed in U.S. Letters Patent No. 2,983,692, and including polymers such as polystyrene, polyalkylenes, polyacrylic esters, etc. by incorporating therein a volatile substance such as a lower aliphatic hydrocarbon, e.g. pentane, which are characterized in that they may be expanded and formed to a desired shape and permanently set when subsequently cooled to temperatures below that required to render them thermoplastic.

Another object is to provide an improved and novel apparatus for making inexpensive foamed articles of the above character from a unicellular expandable thermoplastic material wherein, during the fabrication of an article, the material is rendered thermoplastic and fusable to form an integral structure while simultaneously being caused to assume a precontrolled change by self-expansion to enlarge the cellular structure of the material and thereby substantially reduce its thermal conductivity to provide the article with efficient heat and cold insulating properties.

Another object is to provide apparatus for molding articles of foamed polymeric materials with high frequency electromagnetic waves (dielectric heating).

In the event dielectric heating is employed for beadlet expansion, the molds must, obviously, be of a material having a low loss factor. The material must also have sufficient strength and rigidity to withstand the not inconsiderable internal pressure which is built up by the expansion of the beadlets. Materials which have been used in the past for molds to be used in connection with dielectric heating include polypropylene, glass fiber-reinforced polyester and epoxy resins, polytetrofluoroethylene, and the like.

In broadly outlining the present invention, it will be noted that the apparatus shown relates specifically to the forming of articles from expandable polymeric materials which generally are provided in the form of beadlets for forming within a mold an article of low density integral cellular structure by heating the beads in the mold to cause them to soften and expand within the confines of the mold into a fused, polymer of foamaceous nature. Expandable polystyrene beads are one of the most widely polymeric materials presently in use.

As is disclosed in U.S. Patent No. 2,998,501, high frequency electromagnetic waves can be used for the expansion of the beadlets, if prior to their introduction into the mold they are covered with a material with a high loss factor, such as water preferably containing a suitable surfactant. The density of the molded article can be controlled within limits by pre-expanding the beadlets by methods in apparatus well known to the art. When so pre-expanded by conventional techniques and with the usual apparatus, the pre-expanded pellets may be again rendered thermoplastic at which time a further blowing up or expansion of the pellets ensues.

In utilizing these features of the material, the present invention contemplates, broadly, the forming of a charge of pellets within the confines of individual molds to substantially the shape of the finally formed products by heating the charges while confined within the molds to render the material thermoplastic whereupon expansion of the material will take place to cause it to fill out the molds. At the same time, an integral structure will result from simultaneous fusion of the material in adjoining mold sections.

The shape of the articles formed will be controlled in accordance with the precontrolled shape of the internal cavities of the molds and the expansion of the material will automatically enlarge the structure of the cells of said material to decrease its thermal conductivity and thereby provide the article with highly efficient heat and cold insulating properties. Upon being expanded and fused to the desired ultimate shape within the molds, the articles are cooled at least to the point where they are self-supporting, and thereafter are ejected from the molds.

In order to economically mass produce articles of the above-described general type, the present invention features novel means illustrated in the drawings for automatically continuously forming the improved articles of the invention as discussed briefly hereinabove.

Figure 1:
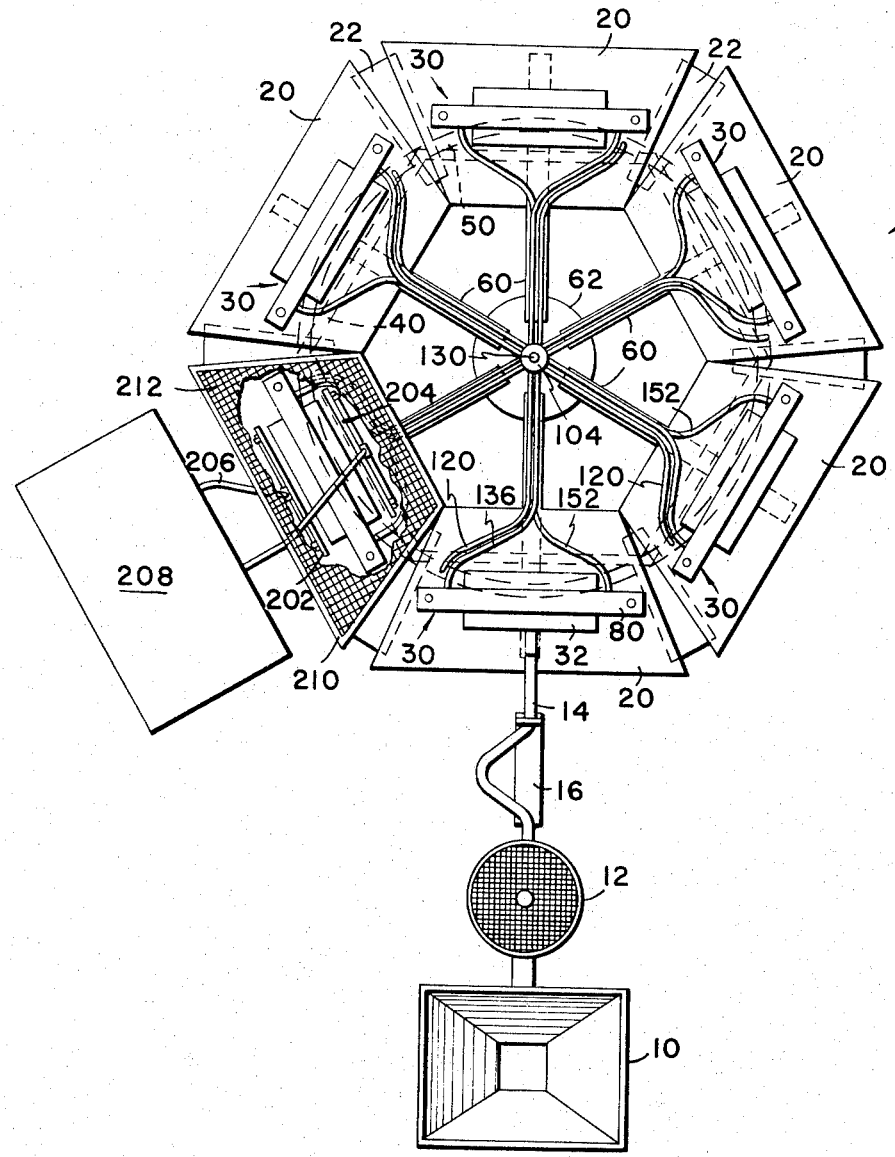
FIG. 1 is a somewhat schematic top plan view of the molding apparatus of this invention.

By referring more particularly to FIG. 1, it will be seen that the pellets are fed directly from a hopper 10 to an agitator 12 and from agitator 12 to the article-forming mechanism by means of a nozzle 14 movable into and out of feed position by a slide means 16. The polystyrene beads are placed in the hopper as needed and are delivered therefrom at a rate which is timed in accordance with the cycling of the article-forming mechanism, to be described in detail hereinafter.

The article-forming mechanism will be seen to comprise a horizontally disposed table which may be constructed of substantially flat segments 20, each said segment carrying a mold assembly 30 on its upper surface. The flat segments 20 together define a polygon or hexagon, with the end of each segment being connected to the end of an adjacent segment as by plates 22 extending horizontally therebetween and fixed thereto by any suitable means to form a table 21 spaced above and parallel with the floor or other supporting surface.

The segments 20 are secured by any suitable means to the upper surface of a series of I-beams joined together to provide a polygonal support 40. As shown diagrammatically in FIG. 9, each segment will, during one complete cycle of operation, move in a clockwise direction and pass through six stations, subsequently to be alluded to.

A plurality of casters 42 (see FIG. 2) are fixed to and depend from the lower surface of support 40, and are adapted to ride along and relative to the upper surface of a circular track 50 disposed below and in contact with support 40 and supported upwardly of the floor or other surface and in parallel relation thereto by a table-like supporting structure comprising upright beams or legs 52 and horizontally-extending support beams 54. While the article-forming mechanism has been described as being of hexagonal shape, it will be understood that it may assume any desired geometric shape, subject only to the dictates of practicality and/or the number of stations to be employed.

A plurality of rigid arms 60 connects support 40 and the segments 20 to a horizontally and centrally-disposed rotatable indexing mechanism 62 which may be of any conventional design. As the indexing mechanism is rotated by an external power source, not shown, the support 40 and the segments 20 fixed thereto are also caused to rotate through an arc prescribed by the arms 60 to the stations I through VI.

Mold assemblies 30 each comprise vertically-aligned upper and lower dies 32 and 34, respectively, each die having a central cavity 36, which cavities in the closed position of the dies will define the shape of the article to be molded. The lower die 34 of each mold will be disposed upwardly of the upper surface of its respective flat segment 20 and will be fixed to the upper surface on opentopped receptacle 38.

Receptacle 38 may carry therein one or more inflatable bag-like members 70 connected by flexible tubing 72 to a source of pressurized air, not shown. The bag-like members 70 will support a horizontally extending plate 74 which is normally disposed below the lower extremities of spring-loaded ejector pins 76 provided in the lower wall of lower die 34 and extending downwardly into receptacle 38.

Figure 3:
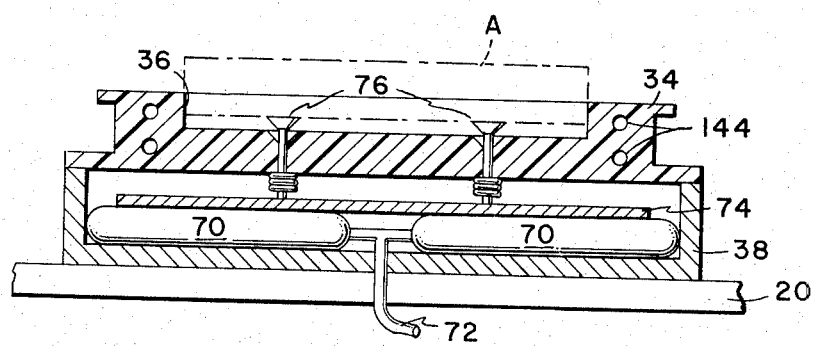
FIG. 3 is an enlarged fragmentary and sectional view of the lower half of one of the mold members of this invention, illustrating features of the automatic ejection means integral therewith.

As shown in FIG. 3, after formation of an article A in the die cavity, and following opening of the dies, pressurized air introduced into the bag-like members 70 inflates the latter to raise plate 74 into contact with the lower ends of ejector pins 76. As the pins are raised the article A is ejected from the die cavity, whereupon air to members 70 is cut off and they collapse, allowing the spring-loaded ejector pins to return to their normal position coplanar with the lower wall of the lower die.

Upper die 32 is fixed to the lower surface of a connecting bar 80 which is in turn at its opposite ends fixed to the upper ends of a pair of upright rods 82 connected to the upper ends of piston rods 84 of a pair of air cylinders 86. Actuation of the air cylinders, to be described, raises and lowers the upper die 32 relative to lower die 34.

Figure 4:
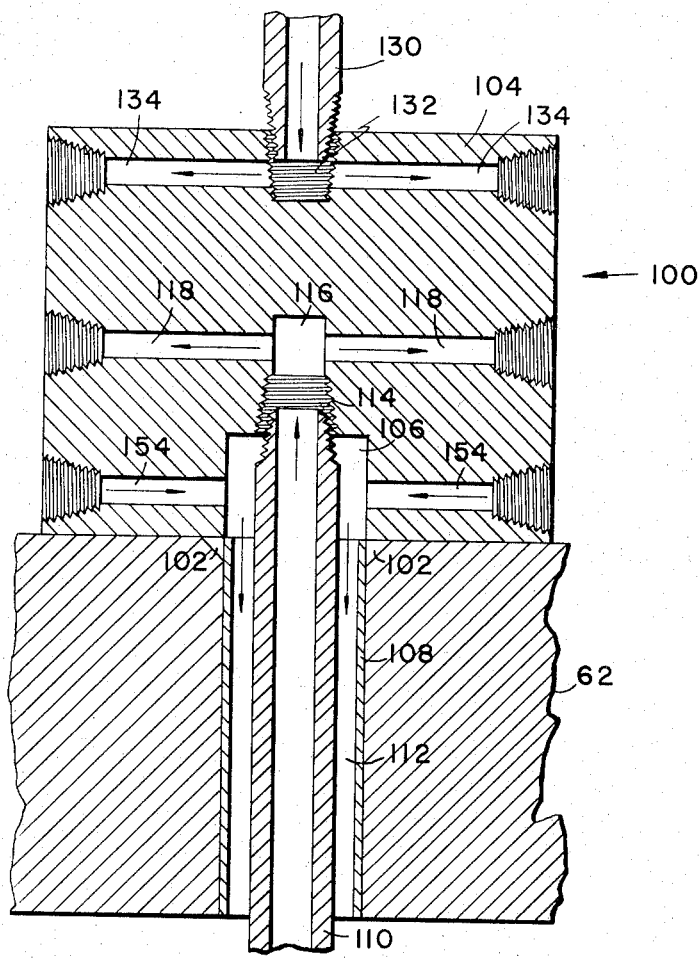
FIG. 4 is an enlarged fragmentary and sectional view of the coolant and pressure distributing means of this invention.

The upper and lower dies are cooled by a suitable coolant fed thereto by flexible coolant lines to be described. For the path of the coolant to and from the dies and air to the cylinders, reference will first be had to FIG. 4, wherein is shown the combination coolant and air distributing means of this invention.

The coolant and air distributing means, generally indicated by 100, is fixed to the upper surface of the indexing mechanism 62 as by weldments 102 or the like and comprises an annular head 104 extending upwardly from the indexing mechanism and having a lower central opening 106 communicating with and coaxial and coextensive with a hollow tube 108 extending vertically through indexing mechanism 62.

An air conduit 110 of smaller diameter than tube 108, but coaxial therewith so as to allow a clearance 112 therebetween, is threaded at its upper end in a threaded opening 114 extending upwardly from lower central opening 106. Air conduit 110 is connected at its lower end to a source of pressurized air, not shown.

Threaded opening 114 communicates with vertically-disposed, annular hub-like air distribution opening 116 provided centrally in head 104. Opening 114 serves as the hub for a plurality of horizontally-disposed air channels 118 extending radially outwardly therefrom to the outer periphery of the head, where they are threaded to accept threaded couplings (not shown) provided at the ends of air supply lines 120 extending along arms 60 and leading to each of the segments 20 and to the air cylinders 86 associated therewith.

Refrigerated coolant is fed into head 104 by a coolant tube 130 threaded in a vertically-extending central opening 132 provided in the upper surface of the head. Central opening 132 serves as the hub for a plurality of horizontally-disposed coolant channels 134 extending radially outwardly therefrom to the outer periphery of the head, where they are threaded to accept threaded couplings (not shown) provided at the ends of coolant supply lines 136 extending along arms 60 and leading to each pad-like segment 20.

Figure 2:
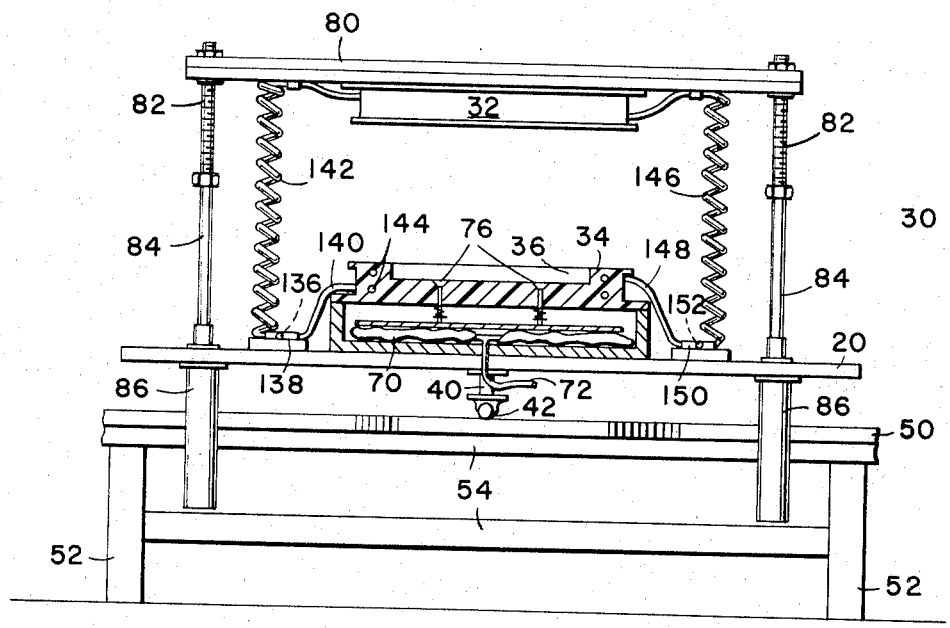
FIG. 2 is a fragmentary elevational view with parts in section, of one of the mold assemblies of this invention, the assembly being shown in its opened position.

As best seen in FIG. 2 each coolant supply line 136 is coupled to a T-coupling 138 provided at one side of lower die member 34. Coolant is led from T-coupling 138 to one side of lower die 34 by a flexible coupling 140 and is led to one side of upper die 32 by a flexible coupling 142. The coolant circulates through tubing 144 provided in the walls of the upper and lower dies and passes out from the other side of the upper die through a flexible return coupling 146 and passes out from the lower die through a flexible return coupling 148, each of said return couplings 146 and 148 leading to a T-coupling 150 provided at the other side of the lower die member.

A coolant exhaust line 152 leads from said T-coupling 150 along one of the arms 60 back to head 104 of the distribution means 100, where it is threaded in the open end of a coolant exhaust channel 154 extending radially outwardly from lower central opening 106 to the outer periphery of the head. Lower central opening 106 serves as the hub for coolant exhaust channels 154 and, being coextensive with tube 108 in indexing means 62, serves to channel the exhaust coolant into the area 112 defined by the space between said tube and air conduit 110. The exhaust coolant flows through tube 108 back to the coolant source (not shown) where it is reprocessed for recirculation through the system.

Dielectric heating means, generally indicated by 200, is provided to electronically heat the material in the mold dies 32 and 34. With the arrangement shown, the dies must be constructed of a material which is non-responsive to high frequency electrical energy wherein substantially no energy conversion from electrical energy to its equivalent in heat energy will take place within the mass of material which is used to form the dies. Many different materials are so characterized and may be used for this construction, one of which is known commercially as "Teflon" and manufactured by E. I. du Pont de Nemours and Company of Wilmington, Del. Molds of the type described in my copending application, Ser. No. 339,483, filed Jan. 22, 1964, are particularly suited for dielectric heating.

Figure 7:
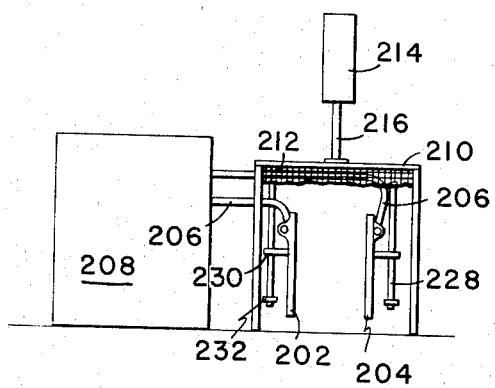
FIGS. 7 and 8 are schematic views of the RF plates of this invention in closed and opened position, respectively.
Figure 8:
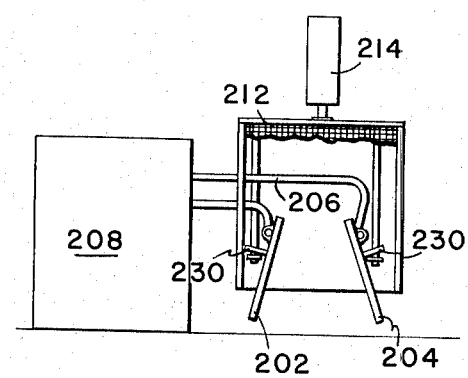

Referring more particularly to FIGS. 7 and 8, it can be seen that a pair of normally upright electrical conducting plate elements or electrodes 202 and 204 are positioned in spaced, parallel relation with each other, and are connected by high frequency lines 206 to a radio frequency generator 208 positioned at a fixed location adjacent the outer peripheral edge of the table 21 by being attached to the base of the machine or mounted on the floor as a separate stationary unit. The fixed location would preferably be at Station II. (See FIG. 9.)

A protective cage 210 having an open bottom and screening 212 (shown in fragmentary view) at its top and sides, is disposed circumadjacent electrodes 202 and 204. When high frequency electrical energy is passing through the electrodes, the cage will be in the down position illustrated in FIG. 7 and the electrodes will be vertically upright and parallel with each other, as shown.

In this position of the cage and electrodes, one of the mold assemblies 30 will be positioned between the electrodes and high frequency electrical energy is applied to the electrodes by means of a generator. Conversion of the electrical energy to heat energy in the material in the dies takes place instantaneously to render the material thermoplastic and to simultaneously expand and fuse. Both of the electrodes are maintained at high potential to avoid the deformation of the electrical field which would result were one of the electrodes grounded and the segments 20 constructed of metal.

Following fusing by RF heat for a pre-determined time period, the generator is automatically shut off whereupon an air cylinder 214, positioned above cage 210 and having the lower end of its ram 216 fixed to the latter, is actuated to raise the cage to the approximate position shown in FIG. 8. As the cage is raised it causes the electrodes 202 and 204 to pivot, in a manner to be described, wherefore their lower ends are moved outwardly away from the dies disposed therebetween. At this time the indexing mechanism is actuated whereby the dies may be rotated out of the RF station, having sufficient clearance to freely pass between the electrodes and under the lower end of the cage, and on to the subsequent cooling and ejection Stations III through VI.

Figure 6:
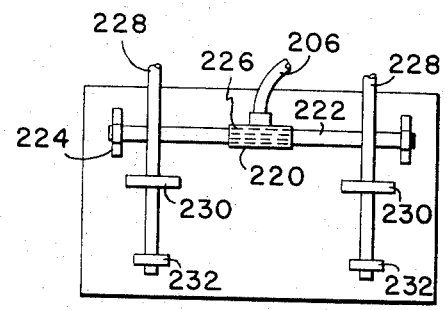
FIG. 6 is a rear elevational view of one of the RF plates of this invention.

As best seen in FIG. 6, each electrode 202 and 204 is joined to its respective high frequency line by a T-coupling 220 having an annular bar 222 passing therethrough and fixed at its opposite ends to its respective electrode as by clamps 224. The inner peripheral wall of T-coupling 220 will be ratcheted or serrated as at 226 and contacts the outer periphery of bar 222.

A pair of rise bars 228 depend from the upper wall of cage 208 and pass loosely through brackets 230 extending horizontally outwardly from the rear surface of the electrodes. As the cage is raised, a stop 232 fixed to the lower end of each rise bar contacts the bracket on the rear surface of the electrode. As the cage continues to rise, the electrodes are caused to pivot relative to the T-coupling until they reach the approximate position of FIG. 8. When the cage is lowered the serrated T-couplings permit the electrodes to return slowly to the down position of FIG. 7 and will not permit the electrodes to swing into the path of the dies which are coming into Station II.

Figure 9:
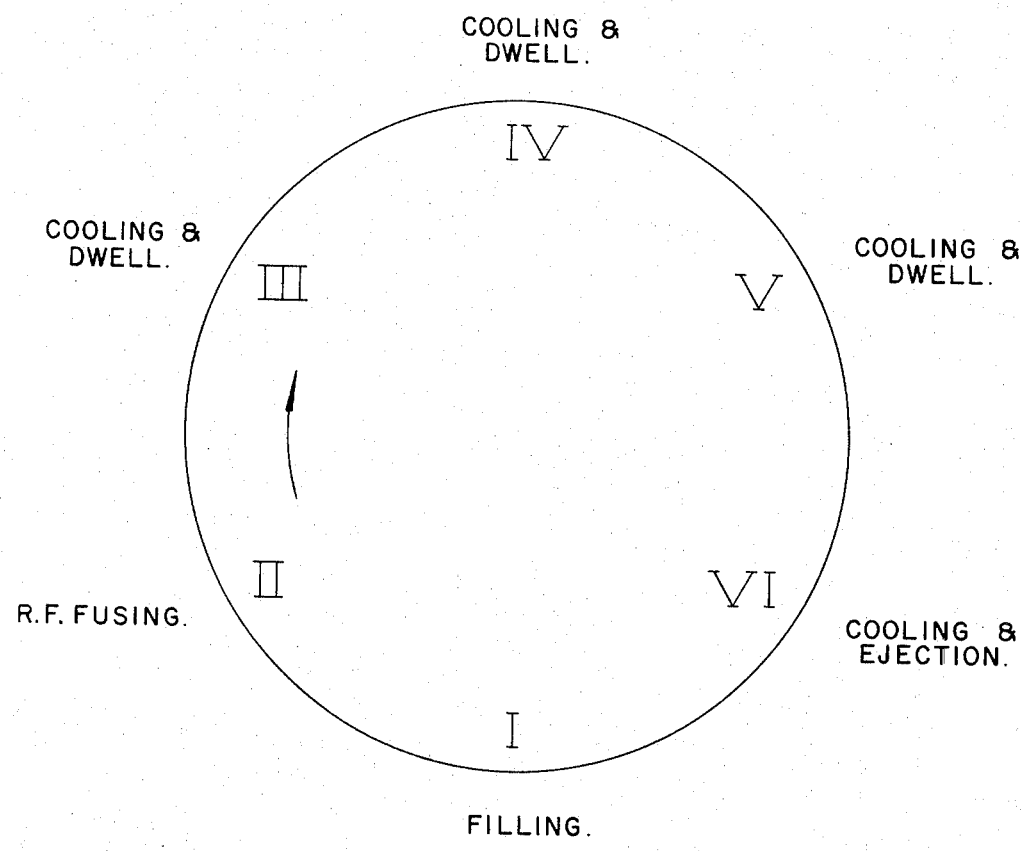
FIG. 9 is a diagrammatic view showing the cycle of operation of the molding apparatus of this invention.

As indicated in FIG. 9, the dies are closed and filled at Station I. Before entering the mold dies the beads, which are contained in the hopper 10 are first moistened with a high loss factor liquid of water and a surfactant by means of atomizer heads 248. The moist beads are sucked by a venturi 250 into agitator 12 where they are agitated by a plurality of beaters 252 driven by a motor M.

Figure 5:
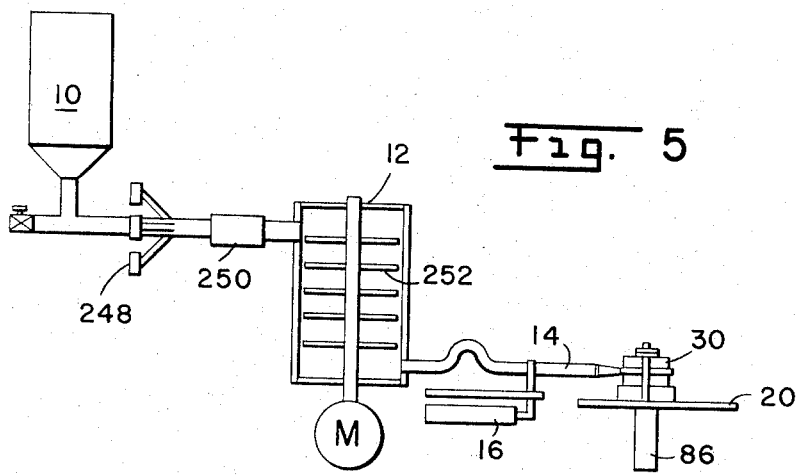
FIG. 5 is a schematic elevational view of the material supply means of this invention.
Figure 10:
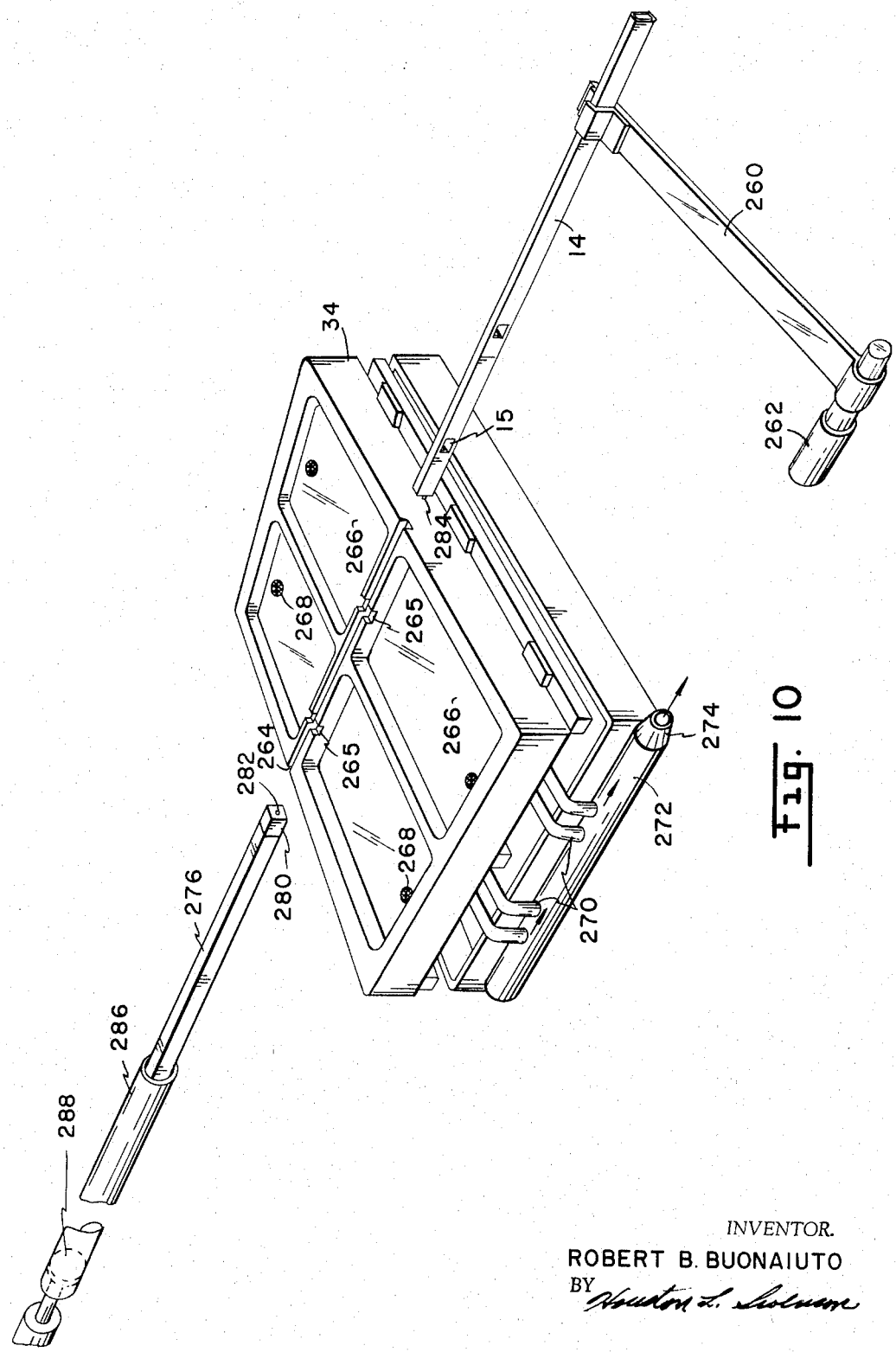
FIG. 10 is a perspective view of the lower half of a mold associated with the beadlet filling means.

FIG. 10 illustrates a vacuum means for filling the dies with moistened beads. At Station I the filling nozzle 14 is coupled in parallel fashion by a brace 260 to a vacuum nozzle 262. The two nozzles are activated by slide means 16 (FIG. 5) which can be an air cylinder, causing them to move forward toward the lower die 34. A sprue channel 264 divides the mold die and is designed to receive bead nozzle 14. Bead inlets 265 are also provided in the lower die to connect the four die cavities 266 with channel 264.

Vacuum is applied to the two mating die halves through the lower die 34. In each of the cavities 266 a vacuum inlet 268 is provided. Each inlet is connected to vacuum lines 270 which in turn are connected to vacuum manifold 272. The manifold inlet 274 is designed to telescope within the vacuum nozzle 262. Thus, when vacuum is applied by a conventional means (not shown), beads are drawn through bead nozzle 14, nozzle outlets 15, inlets 265 and into the cavities. The vacuum inlets comprise screened openings which are smaller than the beads in order to prevent clogging of the vacuum passageways by the beads. Once the cavities are filled, the bead nozzle is withdrawn.

If desired, a sprue filler 276 may be employed to prevent overflowing of the beads into channel 264 after the filler nozzle 14 is withdrawn. The sprue filler is dimensioned to completely fill channel 264 and is displaced from the mold dies only when the filler nozzle is inserted in the mold. A rubber end 280 on the sprue filler contains a socket 282 for receiving a ball 284 on the filler nozzle. As the filler nozzle moves into the die, ball 284 engages socket 282. The sprue filler is pushed into a retainer 286 which has an adjustable stop 288 for controlling the length of travel of the nozzle and filler. When the dies are filled with beads and the nozzle is withdrawn, the filler is pulled back into the channel due to engagement of ball 284 in socket 282. The ball and socket are disengaged once the sprue filler stop 280 rests against the dies.

It is to be understood that the upper die is in a closed position with the lower die throughout the above-described filling operation. While a pressure means could be used to fill the dies with beads, it has been found that the unique vacuum filling means of this invention assures more complete filling of the dies.

After the dies are filled at Station I and the bead nozzle 14 and vacuum nozzle 262 are retracted, the dies are moved by the indexing mechanism to Station II for RF heat and fusing. Following fusing at Station II, the dies are indexed to Stations III through V for a cooling and dwell period at each station. When the dies are indexed to Station VI a short additional cooling and dwell period takes place and then the dies are opened and the finished article is ejected, whereupon the entire cycle is repeated.

It will be understood that the above describes the cycle of only one set of the dies. Each station will always have a pair of dies thereat. When cooling and ejection are taking place at Station VI, filling is taking place at Station I, RF fusing is taking place at Station II, and cooling and dwell are taking place at Stations III through V.

At Station II, heat is applied to the dies to expand the material therein and render the same thermoplastic whereupon the material will fuse together as results from the intermingling of the material and the expansion which enlarges its cellular structure. At Stations III, IV, V and VI, the expanded and fused material is cooled to cause the same to become self-supporting and permanently retain an expanded and integral molded shape. At Station VI the upper die members are retracted and the ejecting pins are raised to push the finished article upwardly out of the lower die. Passing from the Station VI back to Station I, the above process is repeated.

It will also be understood that the refrigerated coolant is constantly being circulated to and through the dies and back to the coolant source for reprocessing. The dies will be held closed by the air cylinders 86 which may additionally include locking means (not shown) to withstand the pressures generated by the expanding material within the dies.

Continuous circulation of the coolant through the mold dies, even while the polystyrene beads are being fused, greatly improves the production output of the apparatus. While the dies are made of a low loss factor material they will still become heated as the result of thermal conductivity from the hot beads that are being fused. By keeping the dies relatively cool in the range of 100–115° F. they are able to efficiently cool the article in the mold.

Continuous cooling avoids overheating the dies during the approximately 30 seconds they may be exposed to electrodes 202 and 204 at Station II. If the dies are permitted to overheat, the cooling cycle would be substantially increased, thereby reducing production output. Sufficient cooling is required in order to avoid post-expansion of the fused article subsequent to opening the dies. Prolonged cooling means that the dies are temporarily unavailable for forming additional articles and, consequently, the cost per article increases. By cooling the dies during the fusing stage the entire cooling of the molded article can be performed in just three stations plus a portion of the ejection Station VI.

For articles approximately 15" x 12" x 2" a mold will be tied up in the cooling period for only 100 seconds. Production rate can be one article per 30 seconds, requiring only six molds. Since the coolant is subjected to the RF field between the electrodes it is apparent that the coolant should be a fluid having a low loss factor. Oil is particularly good as a coolant since it is not materially heated or otherwise affected by an RF field.

In operation, the table 21 is indexed or rotated intermittently by the indexing drive mechanism housed within the base of the apparatus so as to automatically locate the individual segments 20 successively at the stations and to hold the same thereat for a controlled time period. This time period is primarily dependent on the time required to foam and fuse the material at Station I and may be less than 30 seconds.

The flat segments 20 are disposed with their axes at equally spaced distances from each other about a circular path concentric with the axis of the track 50. The radius of said circular path is substantially equal in length to the distance between the respective axes of the electrodes and track. In this manner, it can be seen that rotation of the table 21 about its axis will cause the dies to successively become registered or in axial alignment with the electrodes which, as stated above, are stationary.

It should be made clear that the method and apparatus of the invention are not limited to the manufacture during a production run of any one specific item but may be readily adapted to the manufacture of various different articles and designs thereof simply by employing different molds at the several mold stations.

From the foregoing, it will be seen that simple, efficient and economical means have been provided for accomplishing all the objects and advantages of the invention. Nevertheless, it should be apparent that many changes in the details of construction, arrangement of parts and steps of the method may be made without departing from the spirit of the invention as expressed in the accompanying claims. The invention, therefore, is not to be limited to the exact matters shown and described as only the preferred construction and method have been given by way of illustration.

I claim:
1. Apparatus for forming articles from expandable polymeric materials comprising a rotatable table, a plurality of molds spaced on said table, each of said molds comprising a pair of juxtaposed dies lying in a plane parallel to said table, a fluid coolant supply connected to each of said molds providing continuous coolant circulation therein, a power means connected to said table for rotation thereof, an indexing means associated with said driving means for interrupting the rotation of each of said molds at a plurality of stations on the path of said table including a loading station having a loading means engageable with one of said molds for introduction of polymeric materials, a pair of spaced dielectric heating electrode plates positioned for straddling a filled mold at a second station, said plates being pivotably mounted for assuming a parallel spaced relationship and a second position whereby the lower portions of said plates are further spaced, a cooling station, and an ejection station comprising means associated with an ejection pin mounted on the lower of said juxtaposed dies whereby a molded article is ejected upon separation of said dies, each of said molds having a clamping means associated therewith responsive to said indexing means for separation of said mold dies upon rotation of said mold to said ejection station.

2. In the apparatus as set forth in claim 1 wherein the movement of said plates to and from their first and second positions is effected through a couplement with a protective cage surrounding said plates when charged and adapted for selective upward movement to expose said plates in their second position when uncharged.

References Cited
UNITED STATES PATENTS

| | | | |
|---|---|---|---|
| 2,587,070 | 2/1952 | Spillman | 249—68 |
| 2,951,260 | 9/1960 | Harrison et al. | 18—5 |
| 3,167,811 | 2/1965 | Kraus et al. | 18—5 |
| 3,193,874 | 7/1965 | Jablonski | 18—5 X |
| 2,312,215 | 2/1943 | Howie. | |
| 3,054,141 | 9/1962 | Hammesfahr | 18—20 XR |
| 3,068,526 | 12/1962 | Croan | 18—20 XR |
| 3,069,725 | 12/1962 | Root | 18—20 XR |

WILBUR L. McBAY, *Primary Examiner.*